(12) United States Patent
Itoh

(10) Patent No.: US 6,798,792 B2
(45) Date of Patent: Sep. 28, 2004

(54) LASER DEVICE AND LIGHT SIGNAL AMPLIFYING DEVICE USING THE SAME

(75) Inventor: Katsuhisa Itoh, Tokyo (JP)

(73) Assignee: Hoya Corporation, Tokyo (JP)

(*) Notice: Subject to any disclaimer, the term of this patent is extended or adjusted under 35 U.S.C. 154(b) by 6 days.

(21) Appl. No.: 09/888,500

(22) Filed: Jun. 26, 2001

(65) Prior Publication Data

US 2002/0001320 A1 Jan. 3, 2002

(30) Foreign Application Priority Data

Jun. 30, 2000 (JP) .......................................... 2000-199397

(51) Int. Cl.[7] ................................................ H01S 3/30
(52) U.S. Cl. ............................... 372/6; 372/39; 372/89; 385/141; 385/142; 385/143; 385/144; 385/145; 385/131; 385/132
(58) Field of Search ............................... 372/6, 39, 89; 385/141–145, 131–132; 432/728, 625, 245; 525/196, 198; 528/196, 198

(56) References Cited

U.S. PATENT DOCUMENTS

| | | | | |
|---|---|---|---|---|
| 4,147,712 A | * | 4/1979 | Williams et al. | ............ 556/423 |
| 4,889,901 A | * | 12/1989 | Shama et al. | ............... 526/279 |
| 5,050,173 A | | 9/1991 | Hughes | ........................... 372/6 |
| 5,484,867 A | * | 1/1996 | Lichtenhan et al. | ........... 528/9 |
| 5,953,469 A | * | 9/1999 | Zhou | ........................... 385/22 |
| 6,001,953 A | * | 12/1999 | Davis et al. | ................ 528/196 |
| 6,022,671 A | * | 2/2000 | Binkley et al. | ............. 430/320 |
| 6,052,392 A | * | 4/2000 | Ueda et al. | ..................... 372/6 |
| 6,144,779 A | * | 11/2000 | Binkley et al. | ............. 385/122 |
| 6,144,795 A | * | 11/2000 | Dawes et al. | ................ 385/141 |
| 6,178,187 B1 | | 1/2001 | Ueda | ............................... 372/6 |
| 6,204,304 B1 | * | 3/2001 | Houlihan et al. | ............. 522/88 |
| 6,311,004 B1 | * | 10/2001 | Kenney et al. | ............. 385/130 |
| 6,387,824 B1 | * | 5/2002 | Aoi | ............................. 427/245 |
| 6,434,282 B1 | * | 8/2002 | Binkley et al. | ............. 385/122 |

FOREIGN PATENT DOCUMENTS

| | | |
|---|---|---|
| JP | 5-297228 | 11/1993 |
| JP | 7-183597 | 7/1995 |
| JP | 9-26379 | 1/1997 |
| JP | 9-55556 | 2/1997 |
| JP | 10-190097 | 7/1998 |
| JP | 2001-36170 | 2/2001 |
| WO | WO 90/05752 | * 5/1990 |

OTHER PUBLICATIONS

K. Ueda and A. Liu, "Future of High–Power Fiber Lasers," Laser Physics, vol. 8, No. 3, 1998.
Ken–ichi Ueda, "Optical Cavity and Future Style of High–Power Fiber Lasers," SPIE, vol. 3267.

* cited by examiner

Primary Examiner—Don Wong
Assistant Examiner—Delma R. Flores Ruiz
(74) Attorney, Agent, or Firm—Morgan, Lewis & Bockius, LLP

(57) ABSTRACT

In a laser device and a light signal amplifying device with an optical fiber containing a laser activating substance in the inside for emitting a light beam from the end part in the case the laser activating substance is excited, fixed in a dense state at least partially by an optical medium, a polysilsesquioxane including a repeating unit represented by a general formula $RSiO_{1.5}$ (wherein R represents an alkyl group, a hydroxyl group, a phenyl group, a vinyl group, a 2-chloroethyl group, a 2-bromoethyl group, a hydrogen, a heavy hydrogen, a fluorine, or an oxygen. However, one having R entirely as an oxygen is excluded. Moreover, R may be different per each repeating unit.) is used as the optical medium.

11 Claims, 3 Drawing Sheets

LASER DEVICE AND LIGHT SIGNAL AMPLIFYING DEVICE USING THE SAME

BACKGROUND OF THE INVENTION

1. Field of the Invention

The present invention relates to a laser device and a light signal amplifying device. In particular, it relates to a laser device for laser oscillation by introducing an exciting light to a laser activating substance contained inside an optical fiber, and a light signal amplifying device using the laser device.

2. Description of the Related Art

In the field of optical communication or optical processing technology, development of an inexpensive high output laser device is called for. Conventionally, as a prospective device capable of satisfying the demand, an optical fiber laser device is known. Since the optical fiber laser device promotes the interaction between a laser activating substance and a light by containing the light with a high density as well as increases the interaction length by prolonging the length, a high quality laser beam can be generated three-dimensionally.

In such a laser device, in order to realize a high output or a high efficiency of a laser beam, the issue to be tackled is how an exciting light can be introduced efficiently to a core of an optical fiber with a laser activating substance added. However, in general, since the core diameter is limited to several ten μm or less if the core is set at a single mode waveguide condition, it is difficult to introduce an exciting light efficiently to the end face of this diameter. Therefore, a laser device capable of improving the introduction efficiency of the exciting light and the light collecting property of the output laser beam by introducing the exciting light from the side surface of the optical fiber has been proposed.

For example, JP-A-10-190097 discloses a laser device comprising a structure with an optical fiber integrated by an optical medium in a dense state such that a laser beam is outputted from the end face of the optical fiber by directing an exciting light from the peripheral part of the structure. According to such a device, since the exciting light is introduced from the side surface of the optical fiber, compared with the case of introducing an exciting light from the end face, the exciting light introducing area is dramatically larger. Besides, since the laser beam to be outputted is only of the mode determined by the waveguide structure of the optical fiber, the outputted light from the optical fiber can be collected approximately to the core diameter. Therefore, in the case the fiber is for propagating only the single mode, the taken out light can be collected to the analysis limit. Accordingly, a laser beam of a far higher luminosity than that of the exciting light can be obtained.

However, according to the laser device disclosed in JP-A-10-190097, since the exciting light propagates while traversing the optical fiber, propagation attenuation and scattering loss of the exciting light should be prevented in the gaps in the optical fiber. Therefore, integration of the optical fiber by thermal fusion, and filling the gaps in the optical fiber with an organic adhesive can be conceivable.

Although the gaps can be filled relatively easily with the organic adhesive in the optical fiber, since it is an organic substance, it has a low light resistance power property, and thus the mechanical strength may not be sustained under a strong excitation of several hundred W or more, or the adhesive may be denatured so as not to maintain the transparency.

Moreover, the method of integrating the optical fiber by thermal fusion is carried out by filling the gaps in the optical fiber completely with a glass equivalent to the mother material of the optical fiber. Although the method is highly reliable, since the optical fiber should be fused at a high temperature of 1,500° C. or higher in the case the optical fiber is made from a glass with a high melting point, such as a silica glass, the core of the optical fiber may be deformed. Moreover, a problem arises in that it is difficult to develop an auxiliary jig for keeping the shape, capable of enduring the temperature.

SUMMARY OF THE INVENTION

The present invention has been achieved for solving the above-mentioned problems, and an object thereof is to provide in an easily production step a laser device having the excellent exciting light introduction efficiency and laser oscillation efficiency, and a high resistance with respect to light and heat accompanying the laser oscillation, and a light signal amplifying device using the laser device.

In order to achieve the object, as a result of elaborate study, the present inventor has found out that an organic-inorganic hybrid material having both characteristics of an organic polymer resin with an easy handling convenience, and of an inorganic metal oxide glass with the excellent light resistance and eat resistance provides the excellent properties as an optical medium for fixing an optical fiber in a dense state so as to complete the invention.

The invention provides a laser device with an optical fiber containing a laser activating substance in the inside for emitting a laser beam from the end part in the case the laser activating substance is excited, fixed in a dense state at least partially by an optical medium, wherein the optical medium is an organic-inorganic hybrid material having a 400° C. or lower curing temperature, and once it is cured, a 300° C. or higher thermal decomposition starting temperature, a 1.40 to 1.56 refractive index by an exciting light wavelength capable of exciting the laser activating substance, and a transparency of a 0.5 dB/cm or less loss.

According to the invention, since the flowability of the optical medium can be lost at a 400° C. or lower curing temperature, the laser device production can be facilitated as well as there is no risk of the optical fiber core deformation at the time of the production. Moreover, since it has a 300° C. or higher thermal decomposition starting temperature once it is cured, the device is not damaged by heat or light accompanying the laser oscillation. Furthermore, since the optical medium has a 1.40 to 1.56 refractive index by an exciting light wavelength capable of exciting the laser activating substance, the refractive indices of the optical fiber and the optical medium can be set at the same level, and thus the scattering loss of the exciting light at the boundary of the optical medium and the clad can be restrained to a minimum level. Moreover, since it as a transparency of a 0.5 dB/cm or less loss, attenuation of the exciting light n the optical medium can be prevented. Therefore, a laser device having the excellent exciting light introduction efficiency and laser oscillation efficiency, and a high resistance with respect to light and heat accompanying the laser oscillation can be provided in an easy production step.

In the invention, as the optical medium having the properties, an organic-inorganic hybrid material including a repeating unit represented by a general formula $RSiO_{1.5}$ (wherein R represents an alkyl group, a hydroxyl group, a phenyl group, a vinyl group, a 2-chloroethyl group, a 2-bromoethyl group, a hydrogen, a heavy hydrogen, a fluorine, or an oxygen. However, one having R entirely as an oxygen is excluded Moreover, R may be different per each repeating unit.), can be presented.

Specifically, as the optical medium having the properties, an oligomer or a polymer including a polymethyl silsesquioxane, a polymethyl-hydride silsesquioxane, a polyphenyl silsesquioxane, a polyphenyl-methyl siisesquioxane, a phenyl silsesquioxane-dimethyl siloxane copolymer, a polyphenyl-vinyl silsesquioxane, polycydlohexyl silsesquioxane, a polycyclopentyl silsesquioxane, a polyhydride silsesquioxane, a poly(2-chloro ethyl) silsesquioxane, a poly(2-bromo ethyl) silsesquioxane, a mixture thereof, or a mixture of them and a polysiloxane, or an amorphous silica produced by curing a poly(2-chloro ethyl) silsesquioxane, a poly(2-bromo ethyl) silsesquioxane, or a mixture thereof, or the like, can be presented

DESCRIPTION OF THE PREFERRED EMBODIMENTS

Hereinafter, with reference to drawings, embodiments of the invention will be explained.

Figure 1:
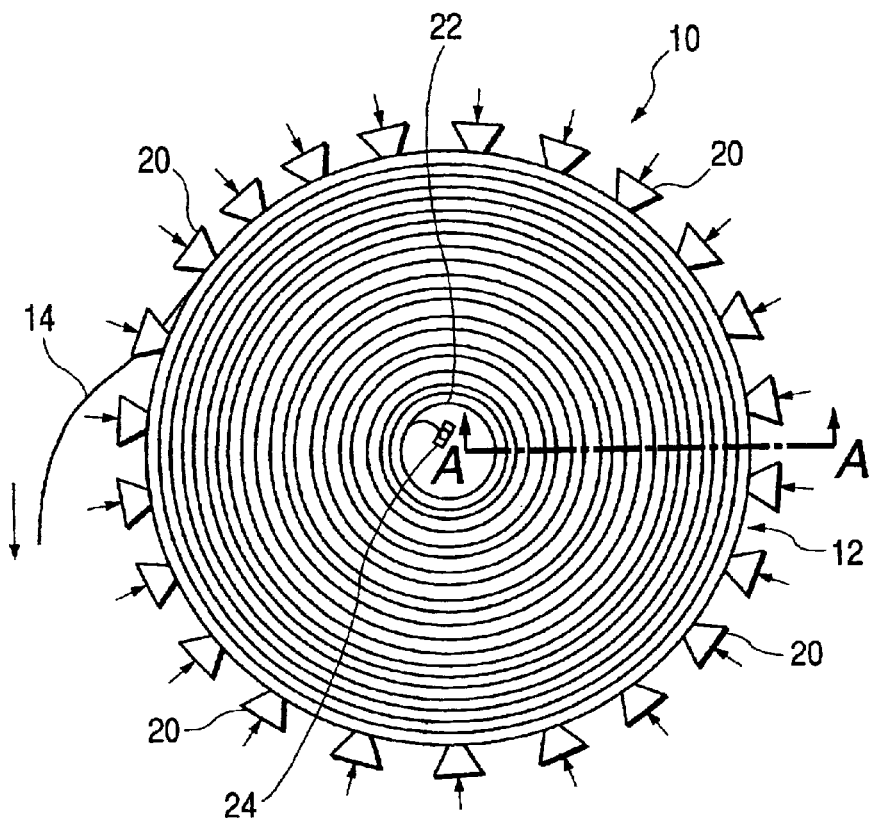
FIG. 1 is a schematic plan view showing a first embodiment of a laser device according to the invention.
Figure 2:
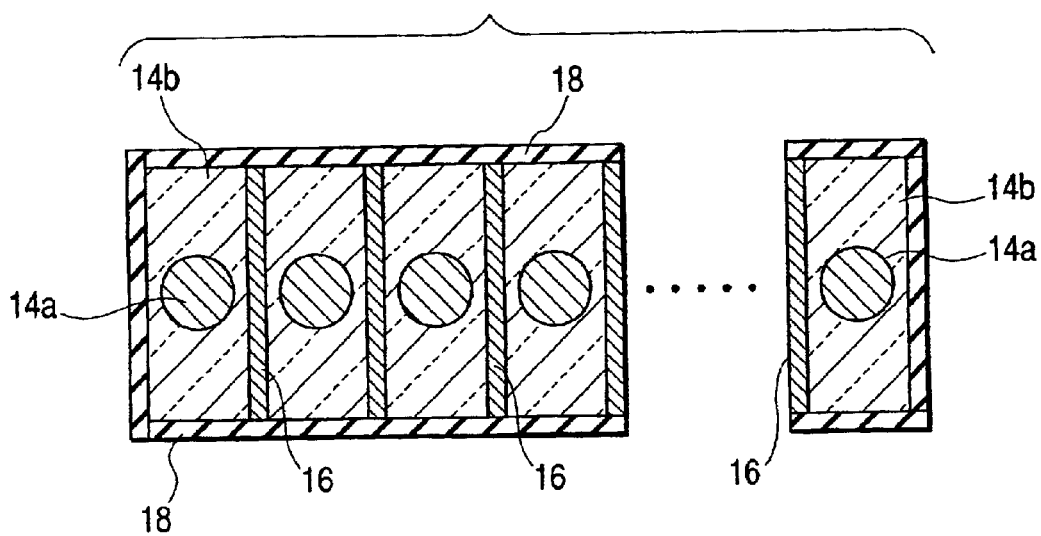
FIG. 2 is a schematic cross-sectional view showing the first embodiment of the laser device according to the invention.

FIGS. 1 and 2 show a laser device 10 according to a first embodiment of the invention.

The laser device 10 comprises an optical fiber structure 12 having an optical fiber 14 fixed in a wound state, and an exciting light source 20 for emitting an exciting light for exciting the optical fiber 14.

The optical fiber structure 12 comprises optical fiber 14 wound around spirally in a single layer, and a bonding layer 16 for bonding and fixing the part of the optical fiber 14 adjacent with each other.

The optical fiber 14 comprises a core 14a with a laser activating substance doped, and a clad 14b formed around the core 14a. The laser activating substance is a substance for generating a laser beam by the dielectric discharge effect by an exciting light. It is selected from rare metal elements, such as a neodymium (Nd), ytterbium (Yb), and erbium (Er), or the like, according to the application of the laser device. In this embodiment, a clad 14b with a rectangular cross-section is used as the optical fiber 14 for reinforcing the bonding strength of the bonding layer 16 as well as for preventing crack generation in the bonding layer 16 by contraction derived from curing of the bonding layer 16. The optical fiber 14 is made of an optical material according to the laser device 10 application. That is, in general, it is a glass having a 1.60 or less refractive index, such as a silica based glass, a phosphate glass, a fluoride glass, a phosphate fluoride glass, and a borate glass.

The optical fiber 14 is wound spirally in a single layer around a cylinder 22 with a reflective surface formed on the outer circumference. One end of the optical fiber 14 is connected with a reflection mirror 24 inside the central member as the reflection end, and the other end thereof is led out to the outside as the output end.

A bonding layer 16 is formed in the part adjacent with each other of the wound around optical fiber 14. By the bonding layer 16, the optical fiber 14 is fixed as a disc-like optical fiber structure 12. As the bonding layer 16, an organic-inorganic hybrid material having a 400° C. or lower curing temperature, and once it is cured, a 300° C. or higher thermal decomposition starting temperature, a 1.40 to 1.56 refractive index by an exciting light wavelength capable of exciting the laser activating substance, and a transparency of a 0.5 dB/cm or less loss, can be used.

As a substance having the properties, an organic-inorganic hybrid material including a repeating unit represented by a general formula $RSiO_{1.5}$ (wherein R represents an alkyl group, a hydroxyl group, a phenyl group, a vinyl group, a 2-cloroethyl group, a 2-bromoethyl group, a hydrogen, a heavy hydrogen, a fluorine, or an oxygen. However, one having R entirely as an oxygen is excluded. Moreover, R may be different per each repeating unit.), can be presented. The organic-inorganic hybrid polymer is, for example, a high degree cross-linked substance obtained by hydrolyzing an organoalkoxy silane, having in addition to a bond of a silicon atom and an oxygen atom, an organic substance side chain in a molecule structure so as to provide a three-dimensional mesh-like structure.

Specifically, as an organic-inorganic hybrid polymer having the properties, optical medium contains an oligomer or a polymer including a polymethyl silsesquioxane, a polymethyl-hydride silsesquioxane, a polyphenyl silsesquioxane, a polyphenyl-methyl silsesquioxane, a phenyl silsesquioxane-dimethyl siloxane copolymer, a polyphenyl-vinyl silsesquioxane, polycyclohexyl silsesquioxane, a polycyclopentyl silsesquioxane, a polyhydride silsesquioxane, a poly(2-chloro ethyl) silsesquioxane, a poly(2-bromo ethyl) silsesquioxane, a mixture thereof, or a cured mixture of them and a polysiloxane, or the like can be presented.

For example, in the case the laser activating substance has an exciting wavelength of about 0.910 μm like an ytterbium, in order to avoid the exciting light absorption due to stretching vibration of a C—H bond at the wavelength, a polyhydride silsesquioxane not having a C—H bond, or the like, is used.

The refractive index of the silsesquioxanes can be adjusted in a 1.40 to 1.56 range by changing the organic side chain. Moreover, by mixing and polymerizing these oligomers, an optically homogeneous polymer can be obtained. Thereby, a polymer having a desired refractive index can be prepared within the range. For example, a polyhydride silsesquioxane having all the organic side chains as methyl groups has a 1.43 refractive index by the sodium D line, and a polyphenyl-methyl silsesquioxane having the side chains as phenyl groups and methyl groups has a 1.49 refractive index by the same. By mixing and polymerizing the oligomers, the refractive index can be adjusted to 1.4585, which is the refractive index of a silica glass clad. Accordingly, by adjusting the refractive indices of the clad 14b of the optical fiber 14 and the bonding layer 16 in the same degree, the boundary of the bonding layer and the clad can substantially be vanished optically so that the exciting light scattering loss can be restrained to a minimum level.

The optical fiber structure 12 can be formed by coating on the optical fiber 14 a solution prepared by dissolving an oligomer or a monomer of the resin in an organic solvent, such as a butanol, an acetone, a methoxy propanol, a pyridine, a tetrahydrofuran, and a methyl isobutyl ketone, winding the optical fiber 14 around the cylinder 22, drying, and curing the resin by heating, ultraviolet ray irradiation, or the like. Thereby, a bonding layer 16 having a high mechanical strength and a transparency of a 0.5 dB/cm or less loss) capable of enduring a high temperature of 300° C. or higher over a long time, can be formed.

The thermal decomposition temperature of the resin is, for example, about 500° C. in the case of a 1:2 mixture of a polymethyl silsesquioxane and a polyphenyl methyl silsesquioxane, and about 350° C. in the case of a phenyl silsesquioxane-dimethyl siloxane copolymer. Moreover, a β-bromoethyl silsesquioxane starts decomposition at 300° C. or higher and forms a dense inorganic film. The thermal decomposition temperature after the formation of the inorganic film is 1,500° C. or higher.

In the case the resin is cured by heating, the curing temperature is 50 to 400° C., in general 100 to 250° C., and thus it can be cured at a temperature considerably lower than the temperature for melting and bonding an ordinary inorganic glass. For example, a poly(2-chloro ethyl) silsesquioxane, a poly(2-bromo ethyl) silsesquioxane, or the like generates a hydrogen chloride or a hydrogen bromide during heating polycondensation so as to serve itself as a catalyst for the polymerization as well as promote leaving of the organic side chain. Thereby, a substantially complete amorphous silica film can be formed at a relatively low temperature of 400° C. or lower in an oxidizing atmosphere, such as an oxygen, and an ozone. Therefore, by using these substances, the optical fiber structure 12 made of a complete inorganic material with the excellent light resistance and heat resistance can be produced at a relatively low temperature.

Moreover, the poly(2-chloro ethyl) silsesquioxane and poly(2-bromo ethyl) silsesquioxane can form the amorphous silica film also by irradiation of an ultraviolet ray of a 180 nm or more wavelength. In this case, the optical fiber structure 12 made of a complete inorganic material can be produced at an ordinary temperature.

As needed, a transparent resin layer 18 of a fluorocarbon resin, an organic-inorganic hybrid material, or the like, having a refractive index same as or preferably slightly smaller than that of the clad 14b f the optical fiber 14 is coated on the optical structure 12.

An exciting light source 20 is disposed in the peripheral part of the optical fiber structure 12 for generating a laser beam by exciting the optical fiber 14. As the exciting light source 20, a semiconductor element such as a light emitting diode (LED) and a laser diode (ID), or lamps such as a flash lamp, capable of emitting a light with a wavelength of exciting the laser activating substance doped in the core 14a of the optical fiber 14, can be used.

Hereafter, the operation of the laser device will be explained.

An exciting light outputted from the exciting light source 20 is introduced into the optical fiber structure 12 from a part with the transparent resin layer 18 partially eliminated. The exciting light proceeds in the optical fiber structure 12 while traversing the side surface of the optical fiber 14 so as to be totally reflected by the transparent resin layer 18 owing to the refractive index difference with respect to the dad 14b of the optical fiber 14, and contained in the optical fiber structure 12. At the time, according to the laser device of the invention, since the bonding layer 16 is formed in the gaps of the optical fiber 14 in the optical fiber structure 12, the exciting light attenuation derived from the propagation, and the exciting light scattering loss at the boundary surface between the clad 14b and the bonding layer 16 can be reduced.

The exciting light excites the laser activating substance doped in the core 14a of the optical fiber 14 so as to generate a laser beam by the dielectric discharge effect. The laser beam propagates in the core 14a of the optical fiber 14 so as to be outputted from the output end.

Thereby, according to the laser device 10 of the invention, a laser device with the excellent exciting light introduction efficiency and laser oscillation efficiency can be provided. Moreover, since the bonding layer can be cured by AWL drying, heating at a relatively low temperature, or an ultraviolet ray as well as it has a high heat resistance once it is cured, a laser device can be provided with a high resistance with respect to an exciting light in an easy production step.

Next, another embodiment of the invention will be explained. In the description below, the same components as above are applied with the same reference numerals, and further explanation is not given.

Figure 3:
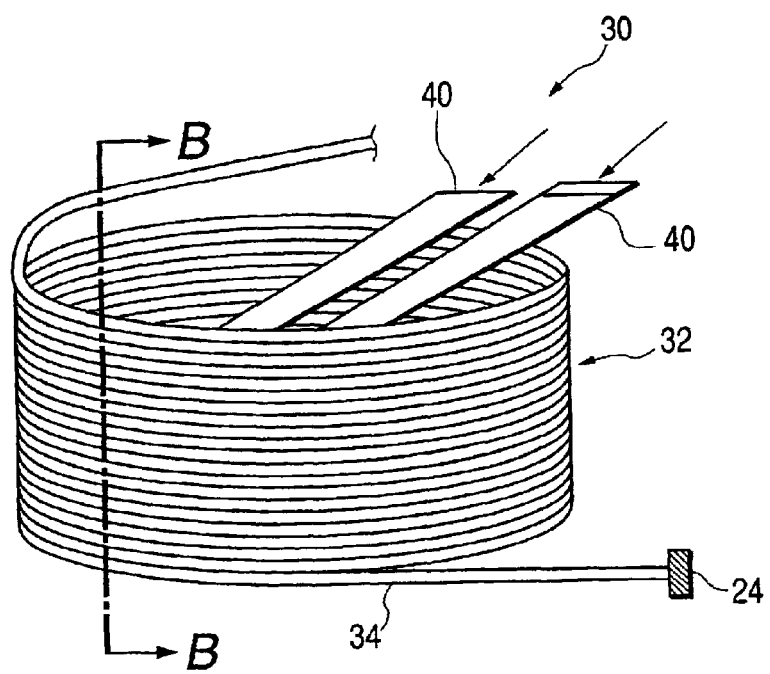
FIG. 3 is a schematic perspective view of a second embodiment of a laser device according to the invention.
Figure 4:
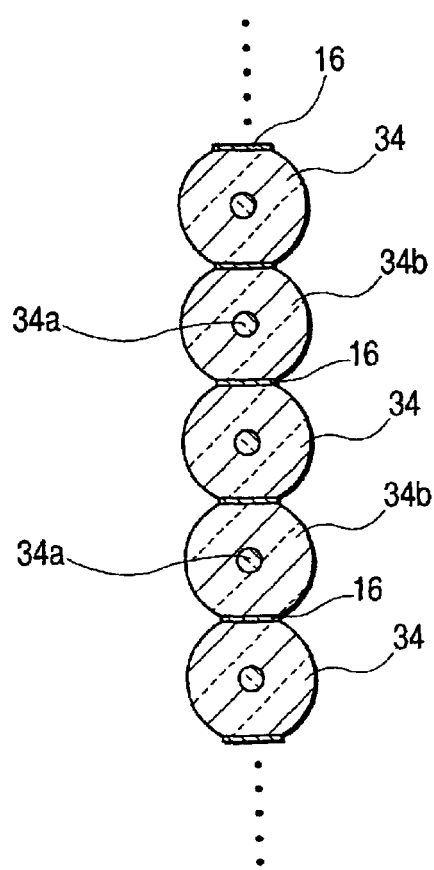
FIG. 4 is a schematic cross-sectional view showing the second embodiment of the laser device according to the invention.

FIGS. 3 and 4 show a laser device 30 according to a second embodiment of the invention.

The laser device 30 comprises an optical structure 32 with an optical fiber 34 fixed in a wound state, an exciting light source (not shown) for emitting an exciting light for exciting the optical fiber 34, and a glass duct 40 as a light guiding member for guiding the exciting light to the optical fiber structure 32.

The optical fiber structure 32 has a structure with the optical fiber 34 wound around like a coil. A bonding layer 16 is formed in a part of the wound optical fiber 34 adjacent with each other such that the optical fiber 34 is fixed by the bonding layer 16 as an optical fiber structure 32 with a self-standing cylindrical shape. In this embodiment, as the optical fiber 34, one having a barrel-like cross-section with two parallel planes chamfered on the clad 34b surface for reinforcing the bonding strength by the bonding layer 16 as well as for preventing crack generation in the bonding layer by contraction derived from curing of the bonding layer 16 is used so that the optical fiber 34 is fixed by bonding the planes with each other. The optical fiber structure 32 can be produced by, for example, winding the optical fiber 34 around the side surface of a cylindrical base without a gap, applying an organic-inorganic hybrid material dissolved in an organic solvent, curing by heating, ultraviolet ray irradiation, or the like, and taking out the base.

A glass duct 40 made of a glass thin plate as a light guiding member is provided on the upper end face of the optical fiber structure 32 for guiding a light outputted from the exciting light source. As the light guiding member, a duct of another shape, an optical fiber, or the like can be used as well. Moreover, the light source can be connected directly with the optical fiber structure without using a light guiding member.

Such a laser device 30 can be operated, for example, also in a cooling medium having a refractive index lower than that of the air or a silica.

Hereafter, the operation of the laser device 30 will be explained. An exciting light outputted from the exciting light source is guided into the optical fiber structure 32 from the upper part via the glass duct 40. The exciting light proceeds in the optical fiber structure 32 downward while traversing the side surface of the optical fiber 34. At the time, according to the laser device 30 of the invention, since the bonding layer 16 is formed in the gaps in the optical fiber 34, the exciting light attenuation derived from the propagation, and the exciting light scattering loss at the boundary surface between the clad 34b and the bonding layer 16 can be reduced.

The exciting light excites the laser activating substance doped in the core 34a of the optical fiber 34 so as to generate a laser beam by the dielectric discharge effect. The laser beam propagates in the optical fiber 34 so as to be outputted from the output end.

Thereby, according to the laser device 30 of the invention, a laser device with the excellent exciting light introduction efficiency and laser oscillation efficiency, and a high resistance with respect to an exciting light can be provided in an easy production step.

Next, a third embodiment of the invention will be explained.

Figure 5:
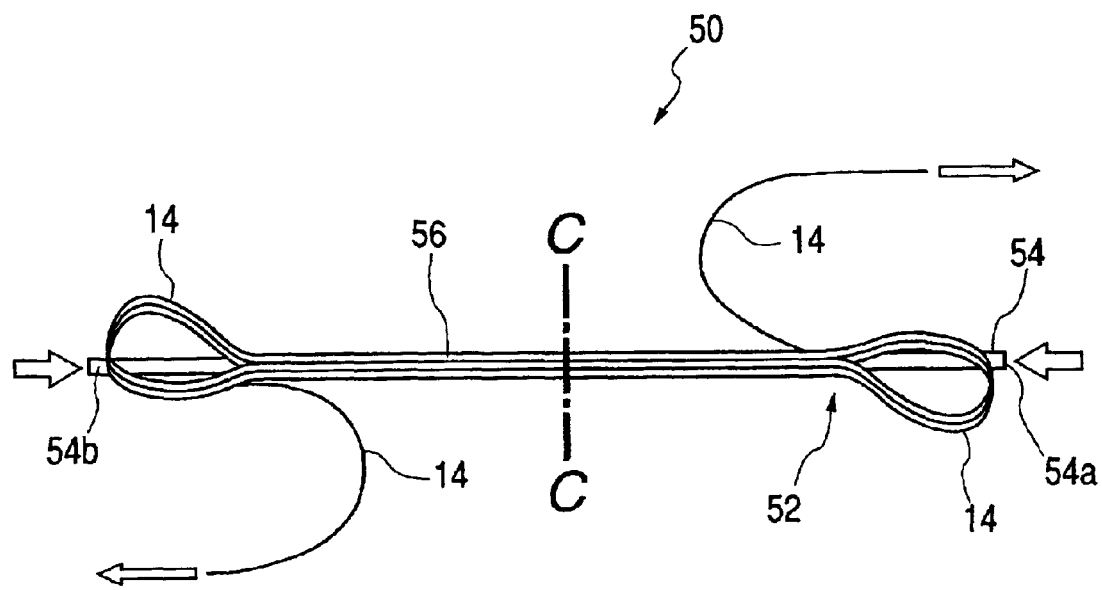
FIG. 5 is schematic perspective view of a third embodiment of a laser device according to the invention.
Figure 6:
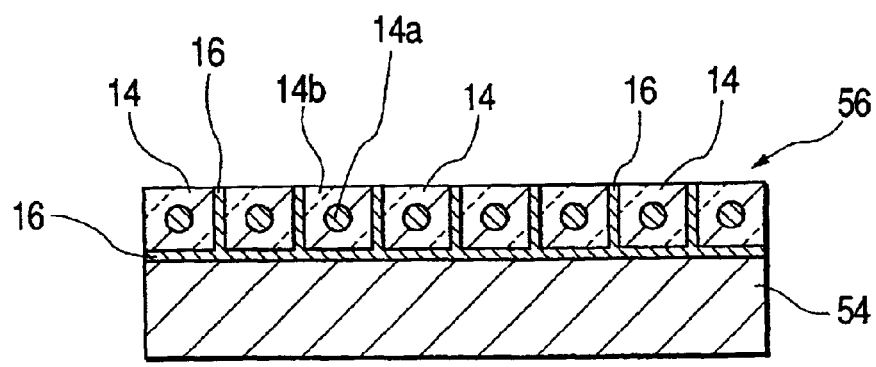
FIG. 6 is a schematic cross-sectional view showing the third embodiment of the laser device according to the invention.

FIGS. 5 and 6 show a laser device 50 according to the third embodiment of the invention.

The laser device 50 comprises an optical fiber structure 52 with an optical fiber 14 fixed in a bundled state after folding for a plurality of times, and an optical substrate 44 for holding the optical fiber structure 52 as well as introducing an exciting light to the optical fiber structure 52.

According to the optical fiber structure 52, the optical fiber 14 providing one optical path is folded by a plurality of times, and the center part thereof forms a bundle part 56 with the optical fiber 14 bundled parallel. In the bundle part 56, the bonding layer 16 is formed in the part of the optical fiber 14 adjacent with each other such that the optical fiber 14 is fixed by the bonding layer 16 as a structure. The bundle part 56 is fixed by the bonding layer 16 on the optical substrate 54 made of a glass, or the like. End faces 54a, 54b of the optical substrate 54 is a polished surface allowing introduction of the exciting light.

The laser device 50 can be produced by disposing a plurality of optical fibers on the optical substrate 54 without a gap, applying thereto an organic-inorganic hybrid polymer dissolved in an organic solvent, curing, and connecting the end faces of the optical fibers so as to connect the optical path integrally by a melting connecting machine. Moreover, it can be produced also by folding an optical fiber for a plurality of times, bundling the center part thereof, and fixing the bundled part on an optical substrate using a bonding layer.

Hereafter, the operation of the laser device 50 will be explained.

An exciting light outputted from the exciting light source is guided into the optical substrate 54 from the end face 54b. The exciting light proceeds while repeating reflection at the upper and lower surfaces of the optical substrate 54. When it reaches at the part provided with the bundle part 56, it is introduced into the optical fiber 14 from the side surface via the bonding layer 16. At the time, according to the laser device 50 of the invention, the exciting light attenuation in the bonding layer 16, and the exciting light scattering loss at the boundary surface can be reduced.

The exciting light excites the laser activating substance doped in the core 14a of the optical fiber 14 so as to generate a laser beam by the dielectric discharge effect. The laser beam propagates in the optical fiber 14 so as to be outputted from the end part led out to the outside.

Thereby, according to the laser device 50 of the invention, a laser device with the excellent exciting light introduction efficiency and laser oscillation efficiency, and a high resistance with respect to an exciting light can be provided in an easy production step.

The invention is not limited to the embodiments, but it can be executed with optional alteration without departing from the scope thereof. For example, in the case a substance with a small thermal contraction ratio is used as the bonding layer 16, an optical fiber with a clad having a round or elliptical cross-section can be used. Moreover, in the case the laser device 10, 30, 50 according to the invention is used as a light signal amplifying device, both ends of the optical fiber 14, 34 are led out to the outside with one end as a signal light input end, and the other end as a signal output end.

Hereafter, examples of the invention will be explained.

EXAMPLE 1

Laser oscillation was executed by the laser device shown in FIGS. 1 and 2.

As the optical fiber 14, 120 m of a silica based glass fiber with a rectangular cross-section, having a 50 μm core diameter, a 70×200 μm clad diameter, and a 0.2 numerical aperture of the core 14a, with a 1.0 at % neodymium ion ($Nd^{3+}$) doped inside the core 14a was prepared. While being wetted by a 10% by weight acetone solution of a 1:2 mixture of a polymethyl silsesquioxane and a polyphenyl-methyl silsesquioxane, the optical fiber 14 was wound around a 60φ inner diameter cylinder 22 with a gold plating applied on the surface, superimposed by a 200 μm width so as to produce a structure, and followed by drying in a clean atmosphere.

After completely finishing the drying operation, the structure was placed in an oven for raising the temperature to 110° C. by a 1° C./minute temperature rise rate. After keeping the same in this state for 30 minutes, it was cooled down to the room temperature by a 10° C./minute rate. The structure was taken out from the oven so that the extra silsesquioxane on the structure was wiped off with water containing an ethanol by 10%. After drying, the structure was placed again in the oven for raising the temperature to 200° C. by a 5° C./minute temperature rise rate. It was kept in this state for 30 minutes. The polysilsesquioxane was cured completely by this operation.

The portion of starting the winding operation of the optical fiber 14 was inserted into a slit formed in the cylinder 22. This end face was attached with a reflection mirror 24 reflecting a 1.06 μm wavelength light by 99% as a reflection end. Moreover, the other end of the optical fiber was led out to the outside as it is with the cut surface as the output end. A transparent fluoro-carbon resin 18 of a 1.33 refractive index was coated on the structure so as to provide the optical fiber structure 12.

23 pieces of LD 20 of a 0.8 μm oscillation wavelength are disposed around the optical structure 12 so that an exciting light of about 120W from each LD 20, totally about 2,760W is introduced via the light guiding duct. As a result, a laser oscillation of about 800W is confirmed in a 1.06 μm band from the output end of the optical fiber 14. Moreover, damage of the optical fiber structure 12 by the laser oscillation is not observed.

As a comparative example, a laser device was produced in the same condition as in the example except that an epoxy based adhesive was used instead of the polysilsesquioxane, and the laser oscillation was carried out. Consequently, a part of the bonding layer was burned by an excitation power of ⅓ or less with respect to the example.

Moreover, a laser device was produced in the same condition as in the example except that the optical fiber was fused with a silica glass instead of the polysilsesquioxane, and the laser oscillation was carried out. In this case, damage was not caused until the maximum output as in the example, but propagation loss of the laser beam propagating in the core was large so that the efficiency was about 70% with respect to the example. From the above-mentioned, the effect of the invention is apparent.

EXAMPLE 2

Laser oscillation was executed by the laser device shown in FIGS. 3 and 4.

As the optical fiber 34, total length 50 m of a silica based glass fiber of a 200 μm diameter, having a barrel-like cross-sectional shape, two rows of planes chamfered parallel disposed with a 125 μm interval, having a 50 μm core diameter, and a 0.2 numerical aperture of the core, with a 1.0 at % neodymium ion doped inside the core was prepared.

The optical fiber 34 was wound around on a 150φ inner diameter column such that the planes contact with each other. Two pieces of silica glass ducts 40 of a 125 μm thickness, and a 12 mm width were installed on the upper part of the optical fiber 34. Thereafter, a 5% by weight methoxy propanol solution of a β-bromoethyl silsesquioxane was applied sufficiently on the contact surfaces between the optical fiber 34 planes and the contact surfaces between the optical fiber 34 and the glass ducts 40, and followed by drying sufficiently in a clean atmosphere.

Thereafter, the extra β-bromoethyl silsesquioxane on the surface was wiped off. An ultraviolet ray was directed for 4 hours by a low pressure mercury lamp. According to the ultraviolet ray irradiation, the β-bromoethyl silsesquioxane was cured completely. Then, the column was taken out so as to obtain a self-standing type cylindrical shaped optical fiber structure 32.

One end face of the optical fiber 34 was attached with a reflection mirror 24 reflecting a 1.06 μm wavelength light by 99% as a reflection end. Moreover, the other end of the optical fiber 34 was left as it is with the cut surface as the output end.

An LD of a 0.8 μm was provided per each piece of the glass duct 40 so that an exciting light can be outputted from each LD by about 100W, and totally about 200W. As a result, a laser oscillation of about 80W was confirmed in a 1.06 μm band from the output end of the optical fiber 34. Damage of the optical fiber structure 32 by the laser oscillation was not observed.

EXAMPLE 3

Laser oscillation was executed by the laser device shown in FIGS. 5 and 6.

As the optical fiber 14, 1 to 2 m, total 20 m of silica based glass optical fibers with a square cross-section, having a 50 μm core diameter, a 125×200 μm clad diameter, and a 0.2 numerical aperture of the core 14a, with a 2.0 at % neodymium ion ($Nd^{3+}$) doped inside the core 14a were prepared. As the optical substrate 54, a silica glass flat plate of a 1.0 m length, a 1.5 mm width, and a 150 μm thickness, with both end faces in the longitudinal direction polished, was prepared. The optical fibers 14 were disposed on the optical substrate 54 along the longitudinal direction without a gap. A 20% by weight batanol solution of a phenyl silsesquioxane-dimethyl siloxane copolymer was applied on the optical fibers 14 so as to permeate between the optical fibers, and between the contact surfaces of the optical fibers 14 and the optical substrate 54, and followed by drying sufficiently in a clean atmosphere. Thereafter, the extra phenyl silsesquioxane-dimethyl siloxane copolymer on the optical fiber 14 surface was wiped off. It was cured by heating at 120° C. for 90 minutes.

Then, the end faces of the optical fibers 14 were connected by a silica fiber fusing furnace so as to have the optical path integrally. The connection loss by the fusing at 1.06 μm wavelength was confirmed to be about the measurement error. Both ends of the optically integrated optical fiber 14 were led out to the outside so as to be left as it is with the cut surface.

A laser diode exciting light of a 0.8 μm oscillation wavelength was directed to both end faces in the longitudinal direction of the optical substrate by 40W per each end face, totally 80W. As a result, total 32W laser oscillation in a 1.06 μm wavelength band was confirmed from both end faces of the optical fiber 14.

Damage of the optical fiber structure 52 by the laser oscillation was not observed.

As it is apparent from the description above, according to the invention, since the optical medium for fixing the optical fiber can be cured at a 400° C. or lower, which is lower than the curing temperature of an ordinary inorganic glass, the laser device production can be facilitated as well as there is no risk of the optical fiber core deformation at the time of the production. Moreover, since the optical medium has a 300° C. or higher heat resistance once it is cured, it is not damaged by heat or light accompanying the laser oscillation. Furthermore, since the optical medium has a 1.40 to 1.56 refractive index by an exciting light wavelength capable of exciting the laser activating substance, the refractive indices of the optical fiber and the optical medium can be set at the same level, and thus the scattering loss of the exciting light at the boundary of the optical medium and the clad can be restrained to a minimum level. Moreover, since the optical medium has a high transparency of a 0.5 dB/cm or less loss, attenuation of the exciting light in the optical medium can be prevented.

Therefore, a laser device having the excellent exciting light introduction efficiency and laser oscillation efficiency, and a high resistance with respect to an exciting light, and a light signal amplifying device using the laser device can be provided in an easy production step.

What is claimed is:

1. A laser device, comprising:
    an optical fiber containing a laser activating substance inside for emitting a laser beam from a distal end portion thereof, at least part of said optical fiber being fixed in a dense state by an optical medium; and
    a laser light source for exciting said optical fiber by emitting an exciting light, wherein
    the optical medium is obtained by curing an oligomer substance so as to be changed to a polymer substance, said oligomer substance being substantially the same as said polymer substance, said polymer substance including a repeating unit represented by an empirical formula $RSiO_{1.5}$ wherein said $RSiO_{1.5}$ is selected from the group consisting of a polymethyl silsesquioxane, a polymethyl-hydride silsesquioxane, a polyphenyl silsesquioxane, a polyphenyl-methyl silsesquioxane, a phenyl silsesquioxane-dimethyl siloxane copolymer, a polyphenyl-vinyl silsesquioxane, polycyclohexyl silsesquioxane, a polycyclopentyl silsesquioxane, a polyhydride silsesquioxane, a poly(2-chloro ethyl) silsesquioxane, a poly(2-bromo ethyl) silsesquioxane, mixtures thereof and a mixture of at least one said $RSiO_{1.5}$ and a polysiloxane.

2. A laser device, comprising:

an optical fiber containing a laser activating substance inside for emitting a laser beam from a distal end portion thereof, a part of said optical fiber being fixed in a dense state by an optical medium; and a laser light source for exciting said optical fiber by emitting an exciting light, wherein the optical medium contains an amorphous silica produced by curing a compound with a repeating unit represented by an empirical formula $RSiO_{1.5}$ wherein said $RSiO_{1.5}$ is selected from the group consisting of a poly(2-chloro ethyl) silsesquioxane, a poly(2-bromo ethyl) silsesquioxane, and a mixture thereof.

3. The laser device according to any of claims 1 and 2, wherein the optical fiber is wound in a spiral shape or a coil-like shape.

4. The laser device according to any of claims 1 and 2, wherein the optical fiber is fixed in a bundled state.

5. The laser device according to any of claims 1 and 2, wherein a flat surface is formed on a side surface of the optical fiber such that the optical fiber is fixed in the state with the flat surface closely contacted with one another.

6. A light signal amplifying device comprising the laser device according to any of claims 1 and 2, having another distal end portion of the optical fiber of the laser device as an input end of a signal light, and the distal end portion as an output end of an amplified light.

7. A laser device, comprising:

an optical fiber wound to form a plurality of adjacent parts;

a bounding layer for bonding and fixing adjacent parts of said optical fiber; and a laser light source for exciting said optical fiber by emitting an exciting light, wherein the optical fiber further comprises:

a core containing a laser activating substance for emitting a laser beam from a distal end portion of the optical fiber; and a clad formed around the core, wherein the bonding layer is an organic-inorganic hybrid material that includes a repeating unit represented by an empirical formula $RSiO_{1.5}$, wherein $RSiO_{1.5}$ is selected from the group consisting of a polymethyl silsesquioxane, a polymethyl-hydride silsesquioxane, a polyphenyl silsesquioxane, a polyphenyl-methyl silsesquioxane, a phenyl silsesquioxane-dimethyl siloxane copolymer, a polyphenyl-vinyl silsesquioxane, polycyclohexyl silsesquioxane, a polycyclopentyl silsesquioxane, a polyhydride silsesquioxane, a poly(2-chloro ethyl) silsesquioxane, a poly(2-bromo ethyl) silsesquioxane, mixtures thereof and a mixture of at least one said $RSiO_{1.5}$ and a polysiloxane.

8. The laser device of claim 7, wherein the organic-inorganic hybrid material forming the bonding layer has a 300° C. or higher thermal decomposition, a 1.40 to 1.56 refractive index and a transparency of 0.5 dB/cm or less loss.

9. The laser device of claim 7, wherein the organic-inorganic hybrid material is a polyhydride silsesquioxane wherein all organic side chains of the polyhydride silsesquioxane are methyl groups.

10. The laser device of claim 7, wherein the organic-inorganic hybrid material is a polyphenyl-methyl silsesquioxane wherein the polyphenyl-methyl silsesquioxane has phenyl groups and methyl groups as side chains.

11. The laser device of any one of claims 1, 2 or 7, wherein the laser light source is selected from the group consisting of a light emitting diode, a laser diode and a flash lamp.

* * * * *